(12) United States Patent
Murai et al.

(10) Patent No.: US 7,048,479 B2
(45) Date of Patent: May 23, 2006

(54) MACHINE TOOL APPARATUS

(75) Inventors: Kazutaka Murai, Anjo (JP); Nobuaki Shirato, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 17 days.

(21) Appl. No.: 10/885,066

(22) Filed: Jul. 7, 2004

(65) Prior Publication Data
US 2005/0025589 A1    Feb. 3, 2005

(30) Foreign Application Priority Data
Jul. 29, 2003    (JP)    ............................. 2003-203168

(51) Int. Cl.
B23B 47/18    (2006.01)

(52) U.S. Cl. ..................... 408/138; 408/137; 408/141

(58) Field of Classification Search ................ 408/138, 408/101, 102, 124, 17, 129, 137, 141, 125, 408/128, 139, 140
See application file for complete search history.

(56) References Cited

U.S. PATENT DOCUMENTS

| 4,066,380 | A | * | 1/1978 | Beck et al. | 408/125 |
| 4,451,185 | A | * | 5/1984 | Yamakage | 408/2 |
| 4,642,005 | A | * | 2/1987 | Kondo et al. | 409/232 |
| 4,643,623 | A | * | 2/1987 | Kondo et al. | 409/232 |
| 4,722,643 | A | * | 2/1988 | Johnson | 408/142 |
| 4,741,650 | A | * | 5/1988 | Nakata | 408/137 |
| 4,911,588 | A | * | 3/1990 | Ikemoto et al. | 408/137 |
| 5,096,343 | A | * | 3/1992 | Luu | 408/134 |
| 5,603,590 | A | * | 2/1997 | Wozar | 408/31 |
| 5,697,739 | A | * | 12/1997 | Lewis et al. | 409/230 |
| 5,865,575 | A | * | 2/1999 | Johnson | 408/139 |
| 6,682,277 | B1 | * | 1/2004 | Endo et al. | 409/231 |
| 6,752,750 | B1 | * | 6/2004 | Adachi et al. | 483/31 |

FOREIGN PATENT DOCUMENTS

| JP | 60044245 | A | * | 3/1985 |
| JP | 62120957 | A | * | 6/1987 |
| JP | 63089207 | A | * | 4/1988 |
| JP | 03287306 | A | * | 12/1991 |
| JP | 2001-138176 | | | 5/2001 |
| JP | 2002-046006 | | | 2/2002 |

* cited by examiner

Primary Examiner—Boyer D. Ashley
Assistant Examiner—Ali Abdelwahed
(74) Attorney, Agent, or Firm—Bacon & Thomas, PLLC

(57) ABSTRACT

A machining tool has a tool holder aligned on an axis of rotation $\beta$ of its shaft, which axis $\beta$ is oblique to the axis of rotation of a spindle at a predetermined angle $\theta$. Accordingly, the machining tool may perform oblique machining of a workpiece. A power transmission mechanism that transmits rotation of the spindle to the machining tool is formed as an attachment to the spindle and includes a rotatable shaft, a second bevel drive gear, a second bevel driven gear, and a feed shaft. Further, a feed mechanism which feeds the machining tool along the axis $\beta$ of the rotatable shaft is formed of the attachments, the rotatable shaft; the second bevel drive gear and the second bevel driven gear, a first bevel drive gear a first bevel driven gear, a male screw member, and the feed shaft.

6 Claims, 3 Drawing Sheets

MACHINE TOOL APPARATUS

CROSS-REFERENCE TO RELATED APPLICATION

This application claims, under 35 USC 119, priority of Japanese Application No. 2003-203168 filed Jul. 29, 2003.

INCORPORATION BY REFERENCE

The disclosure of Japanese Patent Application No. 2003-203168 filed on 29 Jul., 2003 including the specification, drawings and abstract is incorporated herein by reference in its entirety.

BACKGROUND OF THE INVENTION

1. Field of the Invention

The invention relates to a machine tool apparatus (machining center) for machining a workpiece, and more particularly to a machining apparatus provided with a machine tool holder that is replaceably mounted on or in a spindle.

2. Description of the Related Art

Conventionally, a machine tool apparatus performs various types of machining operations on workpieces, for example, components of an automatic transmission (hereinafter referred to as "A/T"). These machining operations include at least one process performed in a direction that is oblique to the axis of the spindle of the machine tool apparatus.

For the type of machine tool that machines obliquely with respect to the spindle, Japanese Patent Laid-Open No. 2001-138176 proposes a numerical control apparatus (hereinafter referred to as "NC") for machining an oblique hole in a workpiece. The NC machine tool apparatus disclosed in this publication machines a hole in the workpiece that is oblique to the spindle by using a three directional feed mechanism to execute feed control of the machine tool in the X axis, Y axis and Z axis (spindle) directions.

However, with the NC machine tool apparatus disclosed in the above-mentioned publication, while machining the oblique hole in the workpiece it is necessary to execute three-directional feed control of the machining tool in the X axis, Y axis and Z axis (spindle) directions. Accordingly, the machining control is complicated and cumbersome, and a large number of different programs for feed control of the machining tool are necessary. As a result, the expenditure on programs is substantial. Moreover, the feed mechanism is also complicated since it is necessary to execute movement in three axial directions, namely, the two axial directions (the X and Y axes) in which a table is moved, and the spindle (the Z axis) direction.

SUMMARY OF THE INVENTION

In light of the above described problems, it is an object of the invention to provide a machine tool apparatus that, while machining a workpiece, feed control of the machining tool can be more simply executed and to provide a feed mechanism for the machining tool that is less complicated.

The machine tool apparatus of the present invention includes a machining tool holding unit, a power transmission mechanism that transmits rotation of the spindle to the machining tool, and a feed mechanism that feeds the machining tool in the axial direction of the rotating shaft thereof. Accordingly, it is not necessary to execute feed control in which the machining tool is fed in the direction of the spindle axis (Z axis) direction, and one of X axis and Y axis directions, and instead it is possible to execute feed control such that, when a workpiece is machined, the machining tool itself is directly fed in the machining direction.

Accordingly, particularly when performing oblique machining, it is not necessary to execute simultaneous three-dimensional control, i.e., control along three axes, namely, the X, Y and Z axes, as is conventionally the case, and it is therefore possible to simplify control of the feed of the machining tool. Further, as a result of the above, the programs for feed control of the machining tool can be made simpler, and it is possible to reduce software cost since the complicated programs conventionally used are no longer required.

In addition, since feed control of the machining tool in three dimensions (the X, Y and Z axes) is not necessary, as described above, it is possible to simplify the feed mechanism of the machining tool. Accordingly, for the feed mechanism, it is no longer essential to use a complicated and expensive device that can move the machining tool in three (axial) dimensions, as was conventionally the case. Thus, hardware costs can also be reduced.

Further, more particularly, according to one preferred embodiment of the invention, it is possible to drive both the machining tool and the feed mechanism using rotation of the spindle alone. Such a configuration is beneficial, for example, in the case of a rotating machining tool which is fed along the rotational axis and which is used in applications (like a milling drill for which accurate feed speed control is unnecessary) other than, for example, a hole-drilling operation wherein the inner peripheral surface of an already formed hole is milled. Further, a paired-bevel gear mechanism, including a bevel drive gear and a bevel driven gear, may be used alone. Accordingly, the number of components can be reduced and the configuration can be simplified.

Moreover, in embodiments wherein the machining tool and the feed mechanism are both driven by the rotation of the spindle alone, using paired first and second bevel gear mechanisms, it is possible to finely set the rotational speed difference between the first bevel driven gear and the second bevel driven gear, by appropriately setting the respective rotational speed ratios of the first and second bevel gear mechanisms. As a result, it is possible to realize finely controlled feed of the machining tool, using the mechanical elements of the machining apparatus alone, by controlling rotational speed of the machining tool and the above mentioned rotational speed difference. Accordingly, it not necessary to utilize an electronic control unit, or the like.

Any preferred embodiment may use a screw movement conversion mechanism, making it possible to optimally set feed of the machining tool, by appropriately setting the pitch of a screw portion of the screw movement conversion mechanism.

DETAILED DESCRIPTION OF THE PREFERRED EMBODIMENTS

Hereinafter, a preferred embodiment of the invention will be explained with reference to the drawings.

Figure 1:
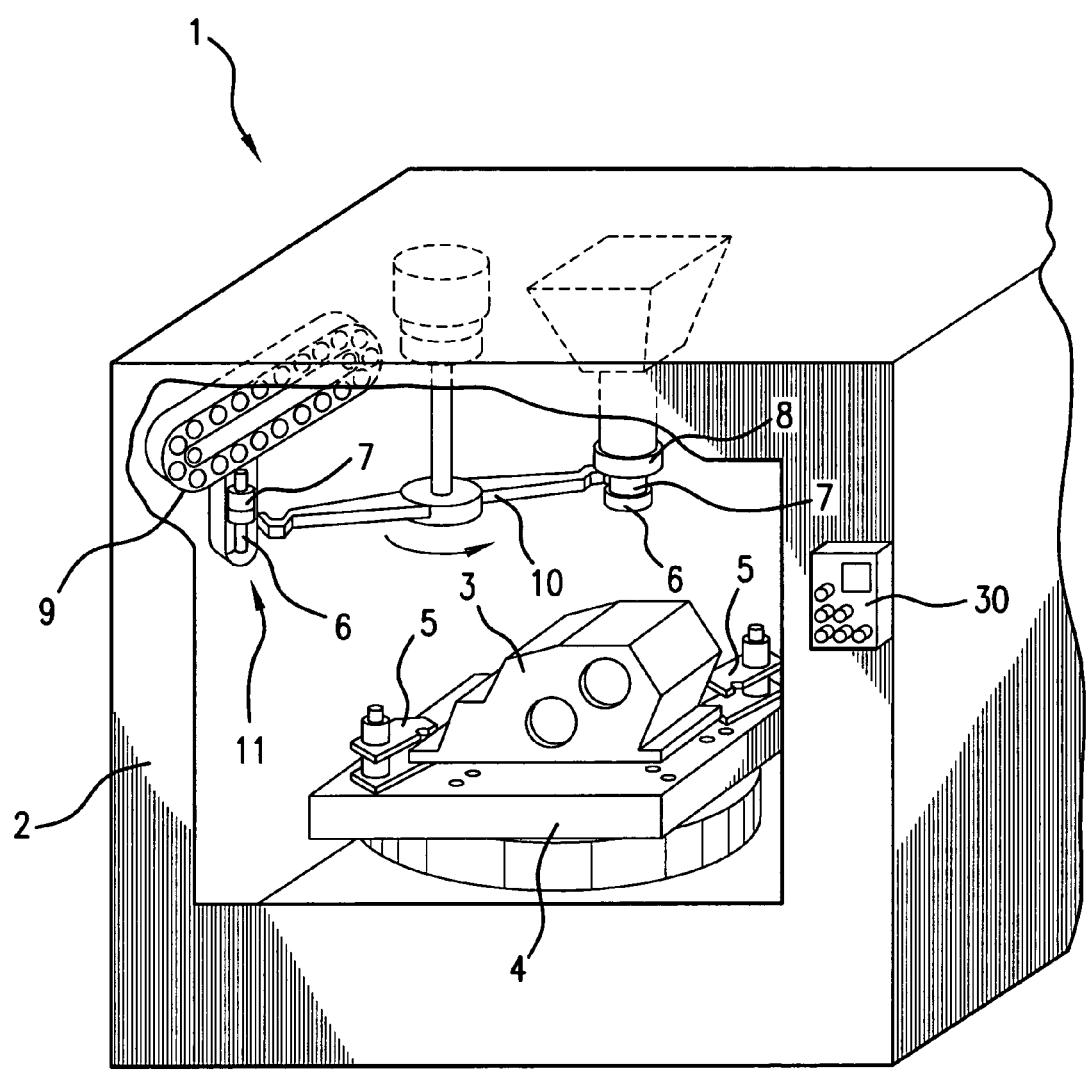
FIG. 1 is a perspective, partial schematic view of an embodiment of a machine tool according to the invention, applied to a machining center.

FIG. 1 shows a preferred embodiment of the machine tool (hereinafter referred to as "M/C") 1 as including body 2, a table 4 that fixedly supports a workpiece 3, a clamp device 5 that fixes the workpiece 3 to the table 4, tool holders 7 (which correspond to the "machining tool holding unit" of the invention) which hold various removable tools 6, a spindle 8, a tool storage unit 9, and an automatic tool changer 10. Respective tool holders 7 are removably mounted on the spindle 8, which utilizes the respective functions of the tools 6 through transmission of rotation thereto. The tool storage unit 9 stores the tool holders 7. The automatic tool changer 10 automatically removes the tool holder 7 mounted on the spindle 8 at any given time and stores it in the tool storage unit 9, and then automatically mounts on the spindle 8 another of the tool holders 7 (which holds the tool 6 that is necessary for the next process), that is selected from the tool holders 7 stored in the storage unit 9. Note that FIG. 1 also shows an operation panel 30 for the M/C 1.

The tool storage unit 9 includes, for example, a circular tool storage panel that holds the tool holders 7. The tool storage unit 9 is also provided with a tool removal-storage point 11 that facilitates both the removal of the respective tool holders 7 from the tool storage panel and return and holding of the tool holders 7 therein, which operations are performed by the tool changer 10. In addition, the tool storage panel can be rotated so as to position the tool holder 7 that is fitted with the necessary tool 6 at the tool removal-storage point 11; and to position respective holding units of the tool storage panel (which receive and hold the respective tool holders 7 removed from the spindle 8) at the tool removal-storage point 11.

The various types of the tools 6 stored in the tool storage unit 9 include drills for drilling holes in the workpiece 3; machining tools such as cutting tools for cutting the workpiece 3; and clamping tools that operate the clamping device 5 so as to fix or remove the workpiece 3 from the table 4.

Machining tool 12 is shown as one of the machining tools that can be removably fitted in the respective tool holder 7 (shown in FIG. 2 and FIG. 3 described hereinafter). Machining tool 12 performs a machining operation on the workpiece 3, and may be, for example, a drill for drilling a hole in the workpiece 3 or a tap for threading an inner peripheral surface of a previously drilled hole.

Figure 2:
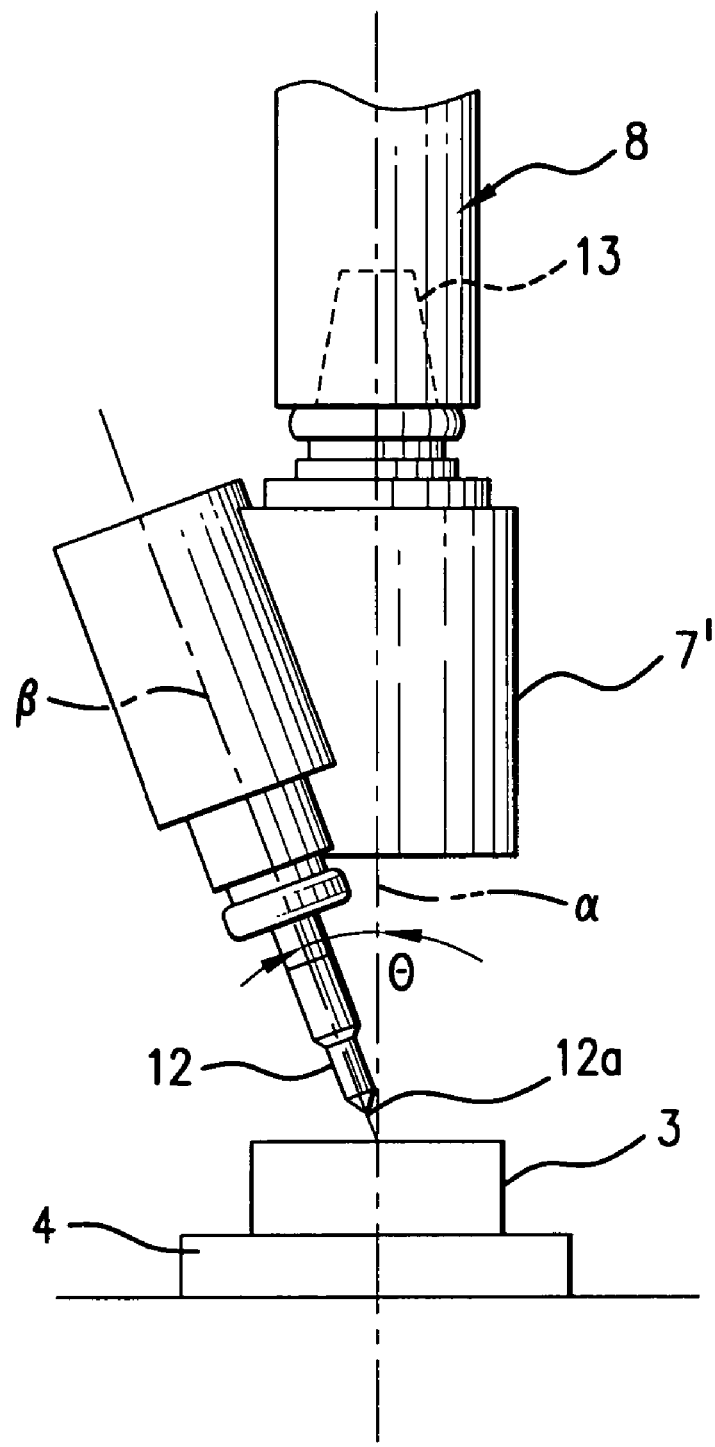
FIG. 2 shows a machining tool holder fitted to a spindle in order to perform oblique machining in the machining center shown in FIG. 1.

As shown in FIG. 2, the machining tool 12 is fitted to the tool holder 7 with the rotational axis (which corresponds to an oblique axis in the invention) $\beta$ of a rotating shaft 18 of the machining tool 12 oblique to axis a of a rotating shaft of the spindle 8 at a predetermined angle $\theta$. Hereinafter, the tool holder 7 to which the machining tool 12 (selected from among the tools 6) is fitted will be referred to as machining tool holder 7'. Accordingly, the apparatus is configured such that the machining tool 12 fitted to the machining tool holder 7' performs an oblique machining operation on the workpiece 3.

Figure 3:
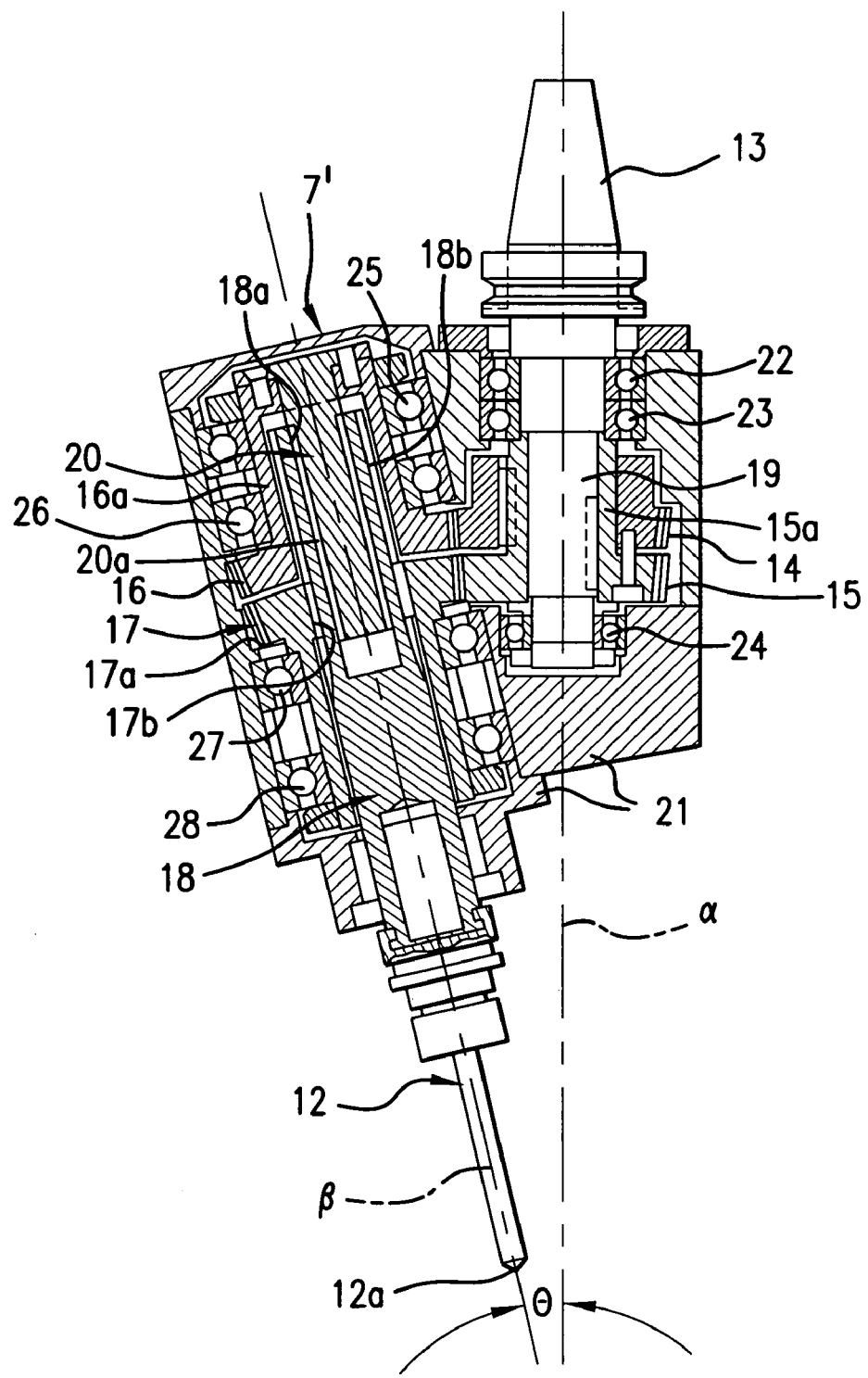
FIG. 3 is a cross-sectional view of the machining tool holder of the example of FIG. 2.

As shown in FIG. 3, the machining tool holder 7' is provided with an attachment 13 that can be removably inserted in the spindle 8; first and second bevel drive gears 14 and 15 that are respectively provided in series and coaxially with the spindle 8; and first and second bevel driven gears 16 and 17 which are provided in series and coaxially with the rotatable shaft 18 of the machining tool 12 and which respectively mesh with the first and second bevel drive gears 14 and 15; and the rotatable shaft 18. A first bevel gear mechanism is formed by the first bevel drive gear 14 and the first bevel driven gear 16, and a second bevel gear mechanism is formed by the second bevel drive gear 15 and the second bevel driven gear 17.

The attachment 13 may be any attachment known in the art, so long as, for example, the attachment can rotate integrally with and be removably mounted in or on the spindle. Further, the attachment should be capable of receiving rotation that is transmitted from the spindle 8. A detailed explanation of the attachment 13 is omitted here. The second bevel drive gear 15 is attached in an integrally rotatable manner to a rotatable shaft 19 that extends from and is coaxial with the attachment 13. In addition, the first bevel drive gear 14 is attached such that it is supported by a tubular shaft portion 15a of the second bevel drive gear 15 and can rotate integrally with the second bevel drive gear 15. In other words, the first bevel drive gear 14 is attached so as to capable of rotating integrally with the rotatable shaft 19.

The first bevel driven gear 16 meshed with the first bevel drive gear 14 has a tubular shaft portion 16a. A male screw member 20 with male threads 20a is attached (screwed) within the tubular shaft portion 16a for rotation integral with the first bevel driven gear 16. Further, the second bevel driven gear 17, which is meshed with the second bevel drive gear 15, is also formed with a tubular extension and has a threaded section 17a formed on an outer peripheral surface portion thereof. A spline groove 17b is formed in the inner peripheral surface of the tooth section 17a.

The rotatable shaft 18 extends through the tubular second bevel driven gear 17 and protrudes into the tubular shaft portion 16a of the first bevel driven gear 16. An inwardly protruding tubular portion 18a of the rotating shaft 18 extends into the tubular shaft portion 16a and has female threads formed on its inner peripheral surface which threadably receive the male screw 20a of the male screw member 20. Moreover, the external surface of the tubular-shaped portion 18a has splines 18b that are spline engaged with the splines 17b of the second bevel driven gear 17. As a result of this spline engagement, the rotating shaft 18 is supported by the second bevel driven gear 17 for rotation integral therewith and for axial movement relative to the second bevel driven gear 17.

The rotating shaft 19 and the first and second bevel driven gears 16 and 17 are all rotatably supported within a case 21 of the machining tool holder 7' by respective bearings 22, 23, 24, 25, 26, 27 and 28. In addition, a protruding tip portion of a tubular shaft portion 18b, which is at the end of the rotating shaft 18 opposite the inwardly protruding portion 18a, extends outward from the case 21. The machining tool 12 can be removably fitted on this protruding tip portion of the rotating shaft 18.

Further, the attachment 13, the rotating shaft 19, and the first and second bevel driven gears 14 and 15 are respectively positioned on and aligned with the axis $\alpha$ of the rotating shaft of the spindle 8. In addition, the first and second bevel driven gears 16 and 17, the rotating shaft 18, and the male screw member 20 are positioned on and aligned with the axis $\beta$ of the rotating shaft 18 of the machining tool 12 that is oblique to the axis $\alpha$ of the rotating shaft of the spindle 8, at a predetermined angle $\theta$.

The gear ratio of the first bevel drive gear 14 and the first bevel driven gear 16 ("first gear ratio") is set such that the rotational speed of the first bevel driven gear 16 is less than the rotational speed of the first bevel drive gear 14. Further, the gear ratio of the second bevel drive gear 15 and the second bevel driven gear 17 ("second gear ratio") is set such that respective rotational speeds of the bevel gears 15 and 17 are the same. In other words, the first and second gear ratios are set differently. As a result of this gear ratio difference, there is a difference between the respective rotational speeds of the first bevel driven gear 16 and the second bevel driven gear 17, namely, a rotational speed difference between the rotational speed of the male screw member 20 and the rotational speed of the rotating shaft 18.

This difference in rotational speeds produces a screw motion conversion, which converts rotational motion generated by the male screw 20a and the female screw 18. Accordingly, the rotating shaft 18 is caused to move axially relative to the bevel driven gear 17, or in other words, the case 21.

More specifically, when the spindle 8 is rotating forward (i.e., the machining tool 12 is rotating in the direction that machines the workpiece 3), the rotating shaft 18 rotates while moving along the axis β so as to extend further from the case 21 (in what is hereinafter referred to as the "extension direction"). Alternatively, when the spindle 8 rotates in reverse it moves along the axis β in a direction retracting the rotating shaft 18 into the case 21 (hereinafter referred to as the "retraction direction").

In other words, the attachment 13, the rotating shaft 19, the second driving bevel drive gear 15, the second bevel driven gear 17, and the rotating shaft 18 together configure a power transmission mechanism that transmits rotation of the spindle 8 to the machining tool 12. In addition, the attachment 13, the rotating shaft 19, the first and second bevel drive gears 14 and 15, the first and second bevel driven gears 16 and 17, the male screw member 20, and the rotating shaft 18 together form a feed mechanism that feeds the machining tool 12 along the axis β. Thus, the machining tool holder 7' is provided with a power transmission mechanism for transmission of power to the machining tool 12 and with a feed mechanism for feeding the machining tool 12.

It should be noted that neither of the first and second gear ratios is limited to those described in the previous example. As long as it is possible to adequately utilize the machining function of the machining tool 12 (by providing a difference between the rotational speeds of the first and second bevel driven gears 16 and 17 that, when the spindle 8 is rotating forward, causes the rotating shaft 18 to extend outward from the case 21), various gear ratios may be utilized.

Next, the operation of the M/C 1 will be explained for a case where the machining tool 12 performs oblique machining of the workpiece 3, as is shown in FIG. 2.

First, the workpiece 3 is placed at a predetermined position on the table 4 of the M/C 1. Then, the tool changer 10 is operated to remove the tool holder 7 fitted with the clamping tool 6, which is stored in the tool storage unit 9. The tool changer 10 then mounts this tool holder 7 on the spindle 8. Next, the spindle 8 and the tool holder 7 are lowered in the Z axial direction (vertically in FIG. 1) so that the clamping tool 6 is placed in contact with the clamping device 5. At the same time, the spindle 8 is operated, whereby the driving power thereof causes the clamping device 5 to be activated by the clamping tool 6. Accordingly, the clamping device 5 clamps the workpiece 3 to the predetermined position on the table 4.

Following this, the spindle 8 and the tool holder 7 are raised and returned to their original positions shown in FIG. 1. Then, the tool changer 10 is operated to remove the tool holder 7 from the spindle 8, and places it in the proper holder of the tool storage panel of the tool storage unit 9. At this time, the holder receiving the tool holder 7 is positioned in the tool removal-storage point 11. Next, the tool storage panel is rotated so that the machining tool holder 7' that is necessary for performing the oblique machining of the workpiece 3 is positioned at the tool removal-storage point 11. Then, the tool changer 10 is operated to remove the machining tool 7' from the tool storage panel and to mount the attachment 13 on the spindle 8, as shown in FIG. 2.

Following this, the spindle 8 and the machining tool holder 7' are lowered until a cutting edge 12a of the machining tool 12 is positioned at a machining start position on the upper surface of the workpiece 3. Then, the spindle 8 is rotated in forward. Accordingly, the rotation of the spindle 8 is transmitted to the machining tool 12 by the power transmission mechanism previously described, and the machining tool 12 is rotated. Further, when the first and the second bevel driven gears 16 and 17 are rotatably driven by the spindle 8, the aforementioned different rotational speeds are producing using the previously described feed mechanism such that the machining tool 12 is rotated while under feed control. In this way, the machining tool 12 performs oblique machining of the workpiece 3 at the predetermined inclination angle θ with respect to the axis a of the rotating shaft of the spindle 8 (for example, hole drilling in the case that the machining tool 12 is a drill, or threading in the case that the machining tool 12 is a tap).

When the oblique machining of the machining tool 12 is completed, the spindle 8 is rotated in reverse, whereby the machining tool 12 is retracted along the axis β of the rotating shaft 18 in the retraction direction while rotating backward. Accordingly, the cutting edge 12a of the machining tool 12 is removed from the workpiece 3. When the machining tool 12 is returned to its initial position, rotation of the spindle 8 is stopped. With this, the oblique machining of the workpiece 3 by the machining tool 12 is completed.

Next, the spindle 8 and the machining tool holder 7' are raised and returned to their original positions shown in FIG. 1, and then rotation thereof is stopped. Following this, as described previously, the tool changer 10 removes the machining tool 7' from the spindle 8, and stores it in the proper holder of the tool storage panel of the tool storage unit 9. Then, the tool holder 7 to which the clamping tool 6 is fitted is once again removed and mounted on the spindle 8. Next, the spindle 8 and the tool holder 7 are lowered, and the clamping device 5 is activated by the clamping tool 6 using driving power of the spindle 8. Accordingly, the workpiece 3 is clamped using the clamping device 5.

With the M/C 1 of this example, it is possible to drive both the machining tool 12 and the feed mechanism with the rotation of the spindle 8 alone. Further, the axis of the machining tool 12 is aligned with the axis β of the rotating shaft 18 which, in turn, is oblique to the axis a of the rotating shaft of the spindle 8 of the M/C 1 at the predetermined angle θ; the machining tool 12 is rotated by rotation of the spindle 8 transmitted to the machining tool 12 by the power transmission mechanism of the tool holder 7'; and the machining tool 12 is axially fed by the feed mechanism of the tool holder 7' driven by the rotation of the spindle 8. Thus, it is possible to perform oblique machining of the workpiece 3 with respect to the axis a of the rotating shaft of the spindle 8 using the machining tool 12. In this manner, it is possible to execute feed control of the machining tool 12 simply by controlling the rotation of the spindle 8. Accordingly, feed of the machining tool 12 can be easily controlled since it is no longer necessary to simultaneously control movement on three axes (the X, Y and Z axes) when performing oblique machining as in the conventional art. Moreover, software costs can be reduced since the program for feed control of the machining tool 12 is simple, and the complicated programs conventionally used are unnecessary. In addition, it is possible to realize stable drive and feed of the machining tool 12 using the mechanical elements of the M/C 1 alone, without utilization of program control by an electronic control unit.

Further, since feed control of the machining tool 12 in three dimensions (on the X, Y and Z axes) is not necessary, it is possible to simplify the feed mechanism of the machining tool 12. Accordingly, for the feed mechanism, it is no longer essential to use a complicated and expensive device that can move the machining tool 12 on three axes, as was conventionally the case. Thus, hardware costs can also be reduced.

Moreover, two bevel gear mechanisms (namely, the first bevel drive gear 14 and the first bevel driven gear 16, and the second bevel drive gear 15 and the second bevel driven gear 17) make it possible to finely set differentiated feeds.

It should be noted that, in the above-described preferred embodiment of the M/C 1, the axis α of the rotating shaft of the spindle 8 and the axis β of the rotating shaft 18 of the machining tool 12 are at the predetermined angle θ. However, the invention is not limited to this configuration. The axis P of the rotating shaft 18 of the machining tool 12 may be set so as to be coaxial with the axis α of the rotating shaft of the spindle 8, or alternatively, the axis β of the rotating shaft 18 of the machining tool 12 may be set so as to be parallel with the axis α of the rotating shaft of the spindle 8. In this case, adoption of gears of another type, such as spur gears, instead of the bevel gears, makes it possible for the machining tool 12 to perform axial machining of the workpiece 3.

In the above described preferred embodiment, the feed mechanism for the machining tool 12 is formed of the two sets of bevel gear mechanisms (the bevel gears 14 and 16, 15 and 17), and the rotational speed difference therebetween is utilized for feed control of the machining tool 12. However, the invention is not limited to such a structure, and it is possible to execute feed control of the machining tool 12 using fluid pressure, i.e., hydraulic or air pressure, or electromagnetic force. With these latter feed controls, the first bevel drive gear 14, the first bevel driven gear 16 and the male screw member 20 may be omitted.

Also, instead of the above-described two sets of bevel gear mechanisms, it is possible to omit the first bevel drive gear 14 and the first bevel driven gear 16. In this case, the male screw member 20 is fixed to the case 21 and thereby held against rotation. With this configuration as well, it is possible to drive both the machining tool 12 and the feed mechanism through rotation of the spindle 8 alone. Such a configuration is beneficial, for example, in the case of a rotating machine tool fed in the direction of the rotational axis and used in applications such as milling the inner peripheral surface of an already formed hole. Further, in this case, only the second bevel gear mechanism, namely, the paired second bevel drive gear 15 and the second bevel driven gear 17, is used. Accordingly, the number of components can be reduced and the configuration is simplified.

Moreover, in the above-described preferred embodiment, the angle θ between the axis α of the rotating shaft of the spindle 8 and the axis β of the rotating shaft 18 of the machining tool 12 is set as a constant. Accordingly, machining must always be performed, relative to the spindle 8, in the fixed direction of the oblique angle θ. However, for example, an angle adjustment unit for the spindle 8 may be provided between the apparatus body 2 and the spindle 8, whereby it is possible to selectively choose the inclination angle of the spindle 8 relative to the axis α of the rotating shaft during normal operation. Alternatively, the angle adjustment unit may be provided between the table 4 and the apparatus body 2, whereby the inclination of the table 4 relative to the apparatus body 2 may be selectively chosen. With such configurations, it is possible to selectively choose the oblique angle at which the machining of the workpiece 3 is performed, i.e., to selectively set angles other than the predetermined angle θ. Moreover, by providing various tool holders 7 with different predetermined angles θ in advance, it is possible to provide different angles as required for oblique machining of the workpiece 3.

Moreover, although the above-described preferred embodiment has been described as a machining apparatus applied to a machining center, the machining apparatus of the invention can be applied as a general purpose machine or a special purpose machine. Further, the invention is particularly suited to a machining tool for a general purpose machine which is capable of tool replacement and which is provided with a tool changer for such replacement.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A machining apparatus comprising:
   a rotatable spindle,
   a table on which a workpiece is fixably mounted;
   a machining tool for machining the workpiece and including a rotatable shaft; and
   a machining tool holding unit mounted on the spindle and to which the machining tool is fitted, the machining tool holding unit including a power transmission mechanism that transmits rotation of the spindle to the machining tool, and a feed mechanism that feeds the machining tool along the axis of the rotatable shaft of the machining tool,
   wherein the rotatable shaft of the machining tool is positioned on an oblique axis that is oblique with respect to a rotatable shaft of the spindle; and
   wherein the feed mechanism includes:
   a bevel gear mechanism having a bevel drive gear which is coaxial with the spindle and which is driven by the spindle, and a bevel driven gear which is provided on the oblique axis and which is driven by the bevel drive gear, and
   a movement conversion mechanism which converts rotation of the bevel driven gear to straight movement along the axis of the machining tool.

2. The machining apparatus according to claim 1, wherein the feed mechanism includes two bevel gear mechanisms, and a movement conversion mechanism that converts rotational movement of the bevel gear mechanisms to straight movement along the axis of the machining tool, wherein
   a first of the bevel gear mechanisms includes a first bevel drive gear driven by the spindle, and a first bevel driven gear which is driven by the first bevel drive gear at a first set rotational speed ratio, and a second bevel gear mechanism includes a second bevel drive gear driven by the spindle, and a second bevel driven gear which is driven by the second bevel drive gear at a second set rotational speed ratio that is different from the first set rotational speed ratio, and wherein the movement conversion mechanism converts rotation of the first bevel driven gear and the second bevel driven gear into straight movement of the machining tool using the rotational speed difference between the first bevel driven gear and the second bevel driven gear.

3. The machining apparatus according to claim 2, wherein the movement conversion mechanism is a screw movement conversion mechanism having a male screw member coaxial with the rotatable shaft of the machining tool, and a female member into which the male member screws;

the first bevel drive gear and the second bevel drive gear are each coaxial with the spindle and rotate integrally therewith;

the first bevel driven gear and the second bevel driven gear are coaxial with the rotatable shaft of the machining tool;

one of the male screw member and the female screw member rotates integrally with the first bevel driven gear, and the other of the male screw and the female member rotates integrally with the second bevel driven gear, and one of the male screw member and the female member rotates integrally with the rotatable shaft of the machining tool.

4. A machining apparatus serving as a machining center for performing various machining processes on a workpiece, the machining apparatus comprising:

a rotatable spindle;

a table on which the workpiece is fixably mounted;

a plurality of machining tools for machining the workpiece; and a machining tool holding unit which is mounted to the spindle and to which one of the machining tools is removably fitted, the machining tool holding unit including a power transmission mechanism that transmits rotation of the spindle to the machining tool, and a feed mechanism that feeds the machining tool axially relative to a rotatable shaft of the machining tool;

wherein the rotatable shaft of the machining tool has an axis of rotation oblique to the axis of rotation of the spindle; and wherein the feed mechanism includes:

a bevel gear mechanism including a bevel drive gear which is coaxial with and driven by the spindle, and a bevel driven gear which is positioned on the oblique axis of rotation and which is driven by the bevel drive gear, and a movement conversion mechanism which converts rotational movement of the bevel driven gear into straight-line axial movement of the machining tool.

5. The machining apparatus according to claim 4, wherein the feed mechanism includes two bevel gear mechanisms, and a movement conversion mechanism that converts rotational movement of the bevel gear mechanisms into straight-line axial movement of the machining tool;

a first bevel gear mechanism includes a first bevel drive gear driven by the spindle, and a first bevel driven gear which is driven by the first bevel drive gear at a first set rotational speed ratio;

a second bevel gear mechanism includes a second bevel drive gear driven by the spindle, and a second bevel driven gear which is driven by the second bevel drive gear at a second set rotational speed ratio that is different from the first set rotational speed ratio, and the movement conversion mechanism converts rotational movement of the first bevel driven gear and the second bevel driven gear into straight-line movement of the machining tool using the difference between the rotational speeds of the first bevel driven gear and the second bevel driven gear.

6. The machining apparatus according to claim 5, wherein the movement conversion mechanism is a screw movement conversion mechanism having a male screw member provided coaxial with the rotating shaft of the machining tool, and a female member into which the male member screws;

the first bevel drive gear and the second bevel drive gear are each coaxial with the spindle so as to rotate therewith;

the first bevel driven gear and the second bevel driven gear are coaxial with the rotating shaft of the machining tool;

one of the male screw member and the female member rotates integrally with the first bevel driven gear, and the other of the male screw member and the female member rotates integrally with the second bevel driven gear, and one of the male screw member and the female member rotates integrally with the rotating shaft of the machining tool.

* * * * *